United States Patent
Huh et al.

(10) Patent No.: US 11,208,104 B2
(45) Date of Patent: Dec. 28, 2021

(54) METHOD OF PROVIDING INFORMATION TO PERFORM INERTIA DRIVING OF VEHICLE

(71) Applicants: Hyundai Motor Company, Seoul (KR); Kia Motors Corporation, Seoul (KR)

(72) Inventors: Jee-Wook Huh, Gyeonggi-do (KR); Dong-Jin Sohn, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 446 days.

(21) Appl. No.: 16/201,595

(22) Filed: Nov. 27, 2018

(65) Prior Publication Data

US 2019/0322280 A1   Oct. 24, 2019

(30) Foreign Application Priority Data

Apr. 24, 2018   (KR) .................. 10-2018-0047363

(51) Int. Cl.
*B60W 30/18* (2012.01)
*B60W 50/14* (2020.01)
(Continued)

(52) U.S. Cl.
CPC .. *B60W 30/18072* (2013.01); *B60W 50/0097* (2013.01); *B60W 50/14* (2013.01); *G06K 9/00791* (2013.01); *B60W 2050/146* (2013.01)

(58) Field of Classification Search
CPC .......... B60W 30/18072; B60W 50/14; B60W 50/0097; B60W 2050/146; B60W 2555/60; B60W 2030/1809; B60W 40/105; B60W 40/02; B60W 2510/0647; B60W 2050/009; B60W 2556/50; B60W 2420/42;
(Continued)

(56) References Cited

U.S. PATENT DOCUMENTS

2007/0173372 A1*  7/2007  Ueno .............. B60W 30/18072
                                                                 477/3
2019/0001983 A1*  1/2019  Park ...................... B60W 50/14

FOREIGN PATENT DOCUMENTS

JP   2016215934 A   12/2016
KR   20080016184 A   2/2008
(Continued)

*Primary Examiner* — Rami Khatib
(74) *Attorney, Agent, or Firm* — Mintz Levin Cohn Ferris Glovsky and Popeo, P.C.; Peter F. Corless

(57) ABSTRACT

A method of providing inertia drive information to perform inertia driving of a vehicle may include recognizing a target position, where deceleration is required from a current speed of the vehicle, as an inertia drive event on a driving route at which a destination is set by a navigation function, when a plurality of inertia drive events are recognized in the recognizing of the target position as the inertia drive event, determining a predetermined priority with respect to each of the plurality of inertia drive events, determining an inertia drive start position required to reach, at a target speed, a target position of an inertia drive event having a high priority, which is determined by the determining of the predetermined priority, among the plurality of inertia drive events, and providing information on an inertia drive start position through a method which is recognizable by a driver.

5 Claims, 17 Drawing Sheets

(51) Int. Cl.
*G06K 9/00* (2006.01)
*B60W 50/00* (2006.01)

(58) Field of Classification Search
CPC ........... B60W 2520/10; G06K 9/00791; Y02T 10/60; B60Y 2300/18066
See application file for complete search history.

(56) References Cited

FOREIGN PATENT DOCUMENTS

| | | |
|---|---|---|
| KR | 101538354 B1 | 7/2015 |
| KR | 20160109616 A | 9/2016 |
| KR | 101703115 B1 | 2/2017 |
| KR | 101713751 B1 | 3/2017 |

\* cited by examiner

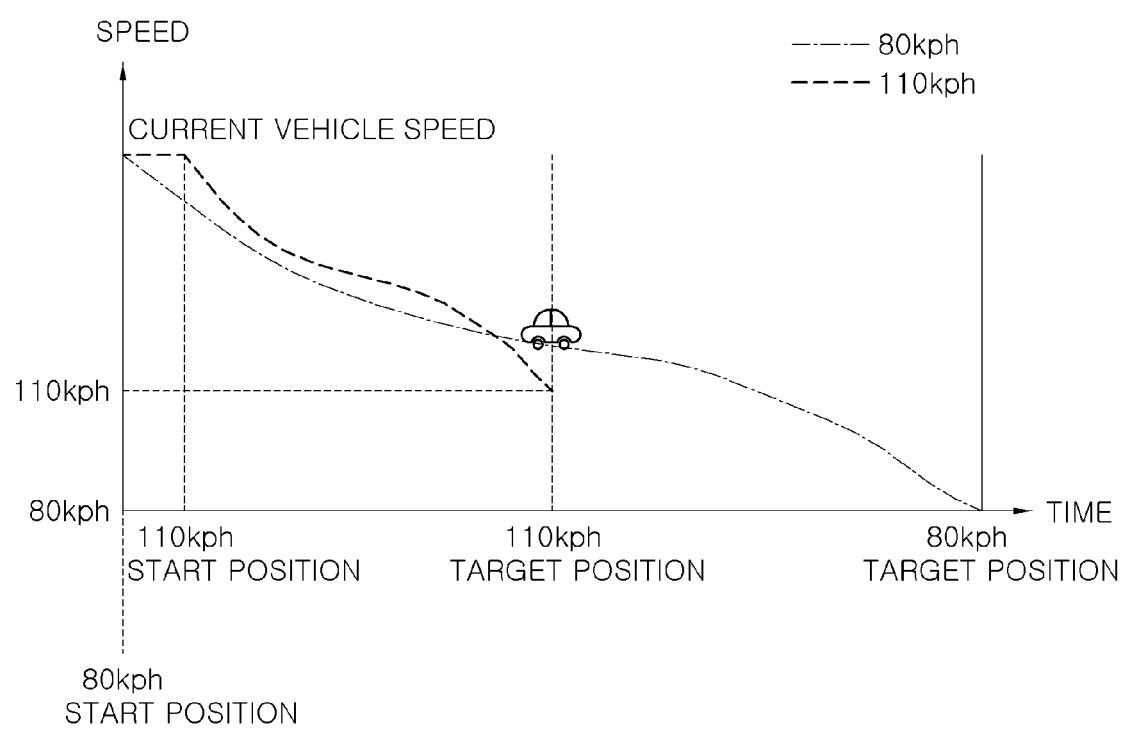

METHOD OF PROVIDING INFORMATION TO PERFORM INERTIA DRIVING OF VEHICLE

CROSS-REFERENCE TO RELATED APPLICATION(S)

This application claims under 35 U.S.C. § 119(a) the benefit of Korean Patent Application No. 10-2018-0047363, filed on Apr. 24, 2018, the entire contents of which are incorporated herein by reference.

BACKGROUND

(a) Technical Field

Exemplary embodiments of the present disclosure relate to a method of providing inertia drive information capable of allowing a driver to perform inertia driving of a vehicle without acceleration or deceleration.

(b) Description of Related Art

Inertia driving refers to a situation in which a vehicle is driving by inertia without acceleration or deceleration, thereby being gradually decelerated.

A function of guiding the inertia driving has been installed in certain vehicles, and a guidance function refers to a function of guiding an inertia drive in advance with respect to a front event using driving information of the vehicle in conjunction with a navigation device and the like.

Thus, when a deceleration event occurs ahead of the vehicle, the inertia drive guidance function induces a driver to decelerate the vehicle through an inertia drive guidance, such that there is an effect of improving fuel efficiency.

Particularly, the inertia drive guidance function is being developed more actively for an eco-friendly vehicle having a motor, and as a technique that can be the basis of autonomous driving in the future, future developments of the inertia drive guidance function are expected.

However, the inertia drive guidance function so far has been used very restrictively due to problems occurring when front information is superimposed, and thus a priority setting of the front information is not definite. The reason will be described with reference to FIGS. 1A and 1B.

FIG. 1A (RELATED ART) is a diagram illustrating a situation of a front road on which a vehicle is driving, a main road on which the vehicle is driving is a 110 km/h (kilometers per hour) road, and the situation is that a first front event requiring deceleration to a vehicle speed of 80 km/h is an interchange (IC) entry, and a second front event is a right turn section requiring deceleration to a vehicle speed of 30 km/h again. Further, a distance between the first front event and the second front event is about 200 meters (m).

Referring to FIG. 1B (RELATED ART), control for each event is performed such that inertia driving for an 80 km/h event is controlled by a speed variation indicated by a dotted line, and inertia driving for a 30 km/h event is controlled by a speed variation indicated by an alternated long and short dash line.

Since the inertia driving is a method of driving a vehicle to reach a target deceleration value at a target position through driving caused by inertia without acceleration or deceleration, a start position of the inertia driving is determined, and thus as shown in FIG. 1B, the vehicle quickly reaches a 30 km/h deceleration start position which is the second front event. Thereafter, inertia driving for a vehicle speed of 80 km/h will be controlled and decelerated from an 80 km/h start position.

That is, since inertia control for the second front event should be performed first, deceleration is started from the main road in advance.

However, in this case, there occurs a problem in that the vehicle speed is excessively low on the main road. As shown in FIG. 1B, this is resulting in a much lower vehicle speed than the vehicle speed of 80 km/h before an 80 km/h target position.

Consequently, a driver is anxious to inevitably accelerate the vehicle instead of performing the inertia driving.

Next, referring to FIG. 2A (RELATED ART), when a main road is a 110 km/h road on which a vehicle is driving and a driver is speeding, a situation is that a first front event is a speed camera and thus deceleration is required to a vehicle speed of 110 km/h, and a second front event is an IC entry requiring deceleration to a vehicle speed of 80 km/h. Further, a distance between the first front event and the second front event is in the range of 400 to 500 m.

Referring to FIG. 2B (RELATED ART) corresponding to control of the situation, the control for each event is performed such that inertia driving for a 110 km/h event is controlled by a speed variation indicated by a dotted line, and inertia driving for an 80 km/h event is controlled by a speed variation indicated by an alternated long and short dash line.

This situation is also such that, in order for the control corresponding to the second front event, an inertia drive start position for a target vehicle speed of 80 km/h becomes an earlier position than an inertia drive start position for a target vehicle speed of 110 km/h.

Consequently, when an inertia drive guidance is performed to reach a target position with a vehicle speed of 80 km/h from the 80 km/h inertia drive start position, the vehicle speed may actually exceed 110 km/h at a 110 km/h target position, such that the vehicle may be speeding.

As described above, the conventional inertia drive guidance cannot efficiently manage the superimposed events, such that there is a problem in that proper control cannot be performed.

Meanwhile, a front event should be updated as a vehicle is driving and thus an inertia drive guidance should be made accordingly, but conventionally, a predetermined number of front events, e.g., four front events are used, and when the number of front events exceeds four, the front event is updated.

However, many events may occur according to operation on a road. For example, events such as a right turn, a left turn, and a turning intersection after entering an IC may be successively generated at a short distance.

In this case, when three or more events are superimposed before and after entering the IC, an IC event is deleted due to updating, and control is performed on the basis of a next event.

This situation frequently occurs on a road of which a lot of events are present, such as a downtown area, and thus a problem occurs that an inertia drive guidance function is not working properly, or control is interrupted due to updating while the inertia drive guidance is performed.

The contents described in the above Description of Related Art are to help the understanding of the background of the present disclosure, and may include what is not previously known to a person of ordinary skill in the art to which the present disclosure pertains.

SUMMARY

An embodiment of the present disclosure is directed to a method of providing inertia drive information, which is capable of controlling inertia driving to be properly performed when front events are superimposed and efficiently updating the front events so as to prevent inconsistency in provision of the inertia drive information.

In accordance with an embodiment of the present disclosure, a method of providing inertia drive information, which includes recognizing a target position, where deceleration is required from a current speed of a vehicle, as an inertia drive event on a driving route at which a destination is set by a navigation function, when a plurality of inertia drive events are recognized in the recognizing of the target position as the inertia drive event, determining a predetermined priority with respect to each of the plurality of inertia drive events, determining an inertia drive start position required to reach, at a target speed, a target position of an inertia drive event having a high priority, which is determined by the determining of the predetermined priority, among the plurality of inertia drive events, and providing information on an inertia drive start position through a method which is recognizable by a driver.

The method may further include determining whether the vehicle passes an inertia drive event, which is first upcoming, among the plurality of inertia drive events, and when the vehicle is determined as passing the inertia drive event that is first upcoming, updating information on the inertia drive event.

The recognizing of the target position as the inertia drive event may be performed with respect to target positions within a front data acquisition effective distance of the vehicle, and when the vehicle is determined as not passing the inertia drive event that is first upcoming even though a new target position occurs within the front data acquisition effective distance, the recognizing of the target position as the inertia drive event may not recognize the new target position as the inertia drive event.

In accordance with another embodiment of the present disclosure, a method of providing inertia drive information, which includes recognizing a target position, where deceleration is required from a current speed of a vehicle, as an inertia drive event on a driving route at which a destination is set by a navigation function, when a plurality of inertia drive events are recognized in the recognizing of the target position as the inertia drive event, determining an upcoming time to a target position with respect to each of the plurality of inertia drive events, determining an inertia drive start position required to reach, at a target speed, a target position of an inertia drive event that is first upcoming, which is determined by the determining of the upcoming time, among the plurality of inertia drive events, and providing information on an inertia drive start position through a method which is recognizable by a driver.

The method may further include determining whether the vehicle passes an inertia drive event, which is first upcoming, among the plurality of inertia drive events, and when the vehicle is determined as passing the inertia drive event that is first upcoming, updating information on the inertia drive event.

The recognizing of the target position as the inertia drive event may be performed with respect to target positions within a front data acquisition effective distance of the vehicle, and when the vehicle is determined as not passing the inertia drive event that is first upcoming even though a new target position occurs within the front data acquisition effective distance, the recognizing of the target position as the inertia drive event may not recognize the new target position as the inertia drive event.

In accordance with still another embodiment of the present disclosure, a method of providing inertia drive information, which includes recognizing a target position, where deceleration is required from a current speed of a vehicle, as an inertia drive event on a driving route at which a destination is set by a navigation function, when a plurality of inertia drive events are recognized in the recognizing of the target position as the inertia drive event, comparing a target speed C of an inertia drive event that is first upcoming with a target speed D of an inertia drive event that is upcoming later among the plurality of inertia drive events, when the target speed C of the inertia drive event that is first upcoming is greater than the target speed D of the inertia drive event that is upcoming later, comparing the target speed D with a preset minimum value Cmin of the target speed C of the inertia drive event that is first upcoming, determining an inertia drive start position required to reach, with a large value of the preset minimum value Cmin or the target speed D, a target position of the inertia drive event that is first upcoming, and providing information on an inertia drive start position through a method which is recognizable by a driver.

The method may further include, when the target speed C is less than the target speed D, comparing the target speed D with the preset maximum value Cmax of the target speed C of the inertia drive event that is first upcoming and determining the inertia drive start position required to reach, with a small value of the preset maximum value Cmax or the target speed D, the target position of the inertia drive event that is first upcoming.

When the inertia drive event that is first upcoming is an event relating to a speed camera, the preset maximum value Cmax may be set to a value equal to the target speed C.

The method may further include determining whether the vehicle passes an inertia drive event, which is first upcoming, among the plurality of inertia drive events, and when the vehicle is determined as passing the inertia drive event that is first upcoming, updating information on the inertia drive event.

The recognizing of the target position as the inertia drive event may be performed with respect to target positions within a front data acquisition effective distance of the vehicle, and when the vehicle is determined as not passing the inertia drive event that is first upcoming even though a new target position occurs within the front data acquisition effective distance, the recognizing of the target position as the inertia drive event may not recognize the new target position as the inertia drive event.

In accordance with yet another embodiment of the present disclosure, a method of providing inertia drive information, which includes recognizing a target position, where deceleration is required from a current speed of a vehicle, as an inertia drive event on a driving route at which a destination is set by a navigation function, when a plurality of inertia drive events are recognized in the recognizing of the target position as the inertia drive event, determining a current speed required to reach, at a target speed through inertia driving, a target position with respect to each of the plurality of inertia drive events, determining an inertia drive start position required to reach, at a target speed, a target position of an inertia drive event having a highest current speed determined by the determining of the current speed, and providing information on an inertia drive start position through a method which is recognizable by a driver.

The method may further include determining whether the vehicle passes an inertia drive event, which is first upcoming, among the plurality of inertia drive events, and when the vehicle is determined as passing the inertia drive event that is first upcoming, updating information on the inertia drive event.

The recognizing of the target position as the inertia drive event may be performed with respect to target positions within a front data acquisition effective distance of the vehicle, and when the vehicle is determined as not passing the inertia drive event that is first upcoming even though a new target position occurs within the front data acquisition effective distance, the recognizing of the target position as the inertia drive event may not recognize the new target position as the inertia drive event.

The method may further include determining an inertia drive start position required to reach, at a target speed, a target position of an inertia drive event having a lowest current speed determined by the determining of the current speed.

BRIEF DESCRIPTION OF THE DRAWINGS

FIGS. 2A and 2B (RELATED ART) are diagrams illustrating another example of the conventional method of providing inertia drive information.

DESCRIPTION OF SPECIFIC EMBODIMENTS

Figure 1A:
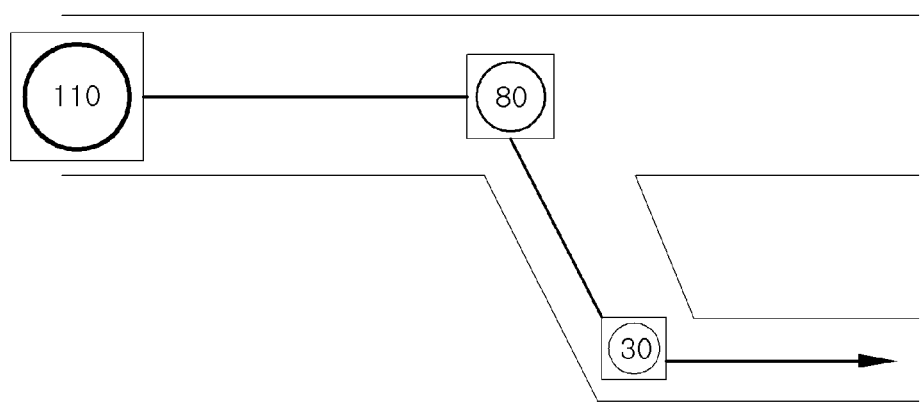
FIGS. 1A and 1B (RELATED ART) are diagrams illustrating an example of a conventional method of providing inertia drive information.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference should be made to the accompanying drawings that illustrate preferred embodiments of the present disclosure, and to the description in the accompanying drawings in order to fully understand the present disclosure and operational advantages of the present disclosure, and objects attained by practicing the present disclosure.

In certain embodiments, known technologies or detailed descriptions may be reduced or omitted to avoid obscuring appreciation of the disclosure by a person of ordinary skill in the art.

The present disclosure first proposes a method of providing information when inertia drive event information are superimposed and also proposes a method of selecting a piece of valid data when superimposed events are excessive.

First, a method of providing information when front events are superimposed will be described.

Conventionally, the following three (3) control methods are proposed by improving a control method in which a superimposed event is controlled according to an event for which control is started first.

1) Method of Assigning Priority

A control method according to the present embodiment is a method in which a priority is assigned to each event and thus an event having a high priority is prioritized.

A priority is set to each of various events such as a speed camera, a tollgate, an interchange (IC), a junction (JC), a traffic circle, a left or right turn, a U-turn, a destination, and the like, control is performed according to the set priority, and a change of the set priority is able to be set.

Figure 3A:
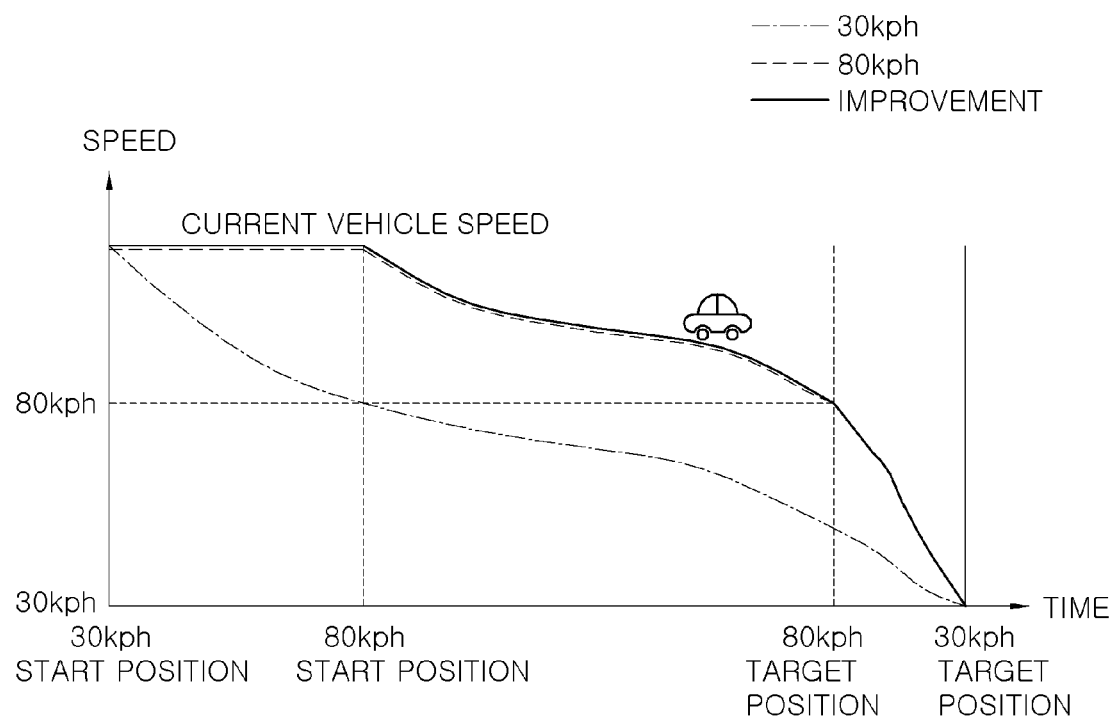
FIGS. 3A and 3B are graphs showing results of a method of providing inertia drive information according to one embodiment of the present disclosure.
Figure 3B:
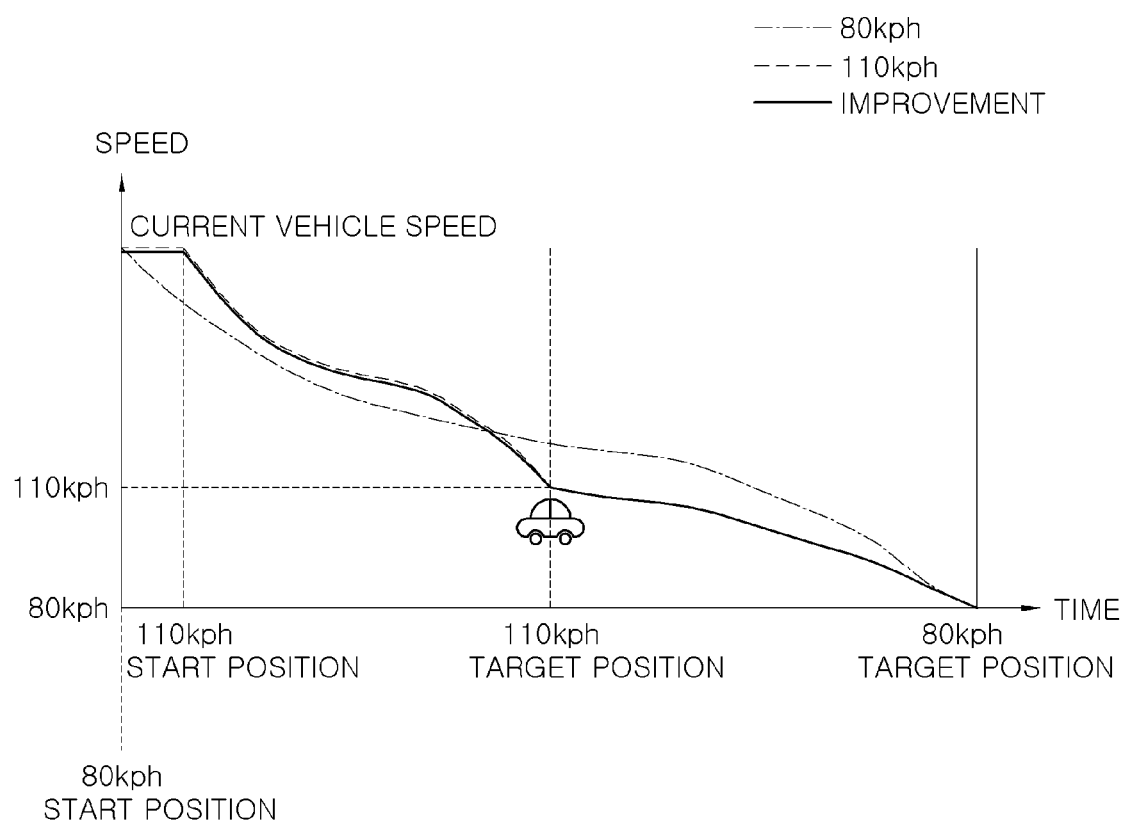

The result according to the above-described control method is shown in FIGS. 3A and 3B.

FIG. 3A corresponds to the above-described situation of FIG. 1A, in which a main road on which a vehicle is driving is a 110 km/h road, and the situation is that a first front event requiring deceleration to a vehicle speed of 80 km/h is an IC entry, and a second front event is a right turn section requiring deceleration to a vehicle speed of 30 km/h again. Further, a distance between the first front event and the second front event is about 200 meters (m).

The control method according to the present embodiment controls the events for the IC entry and the right turn according to preset priorities.

Figure 1B:
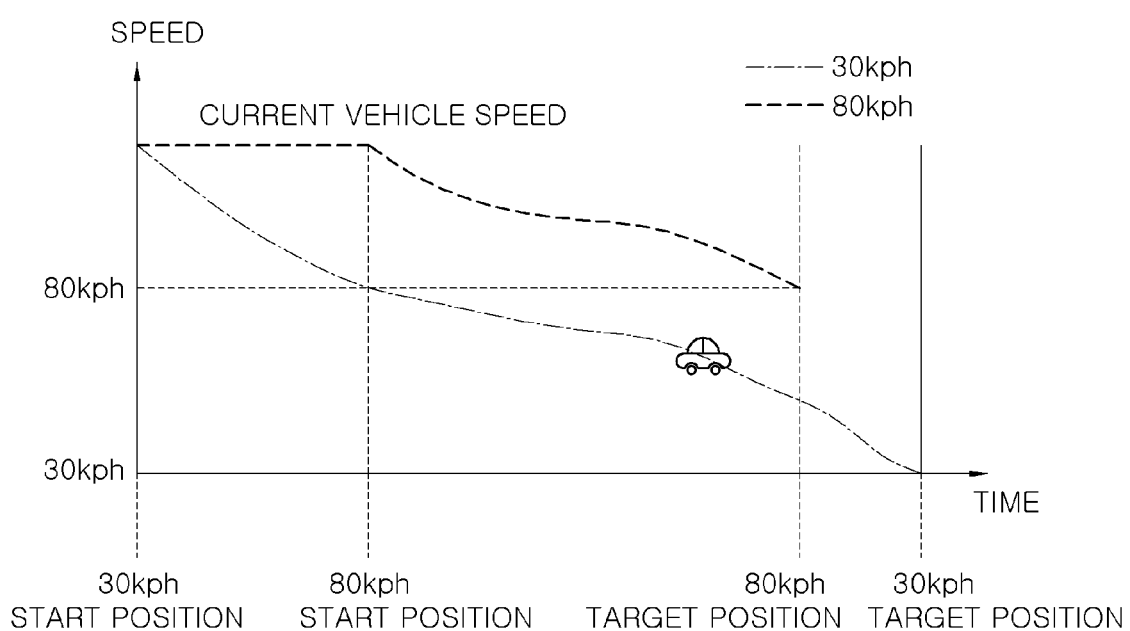

As an example, the result is shown in FIG. 1B in a case in which the IC entry event has a priority higher than that of the right turn event.

Unlike FIG. 1B described above, the control method provides inertia drive information according to 80 km/h at an 80 km/h start position having a higher priority instead of starting the provision of the inertia drive information at a 30 km/h start position, and thus when the inertia driving is performed according to the inertia drive information, the vehicle reaches a vehicle speed of 80 km/h at a 80 km/h target position, and the inertia driving is performed again until a 30 km/h target position after the vehicle passes the 80 km/h target position, such that the vehicle may be able to reach the 30 km/h target position.

Figure 2A:
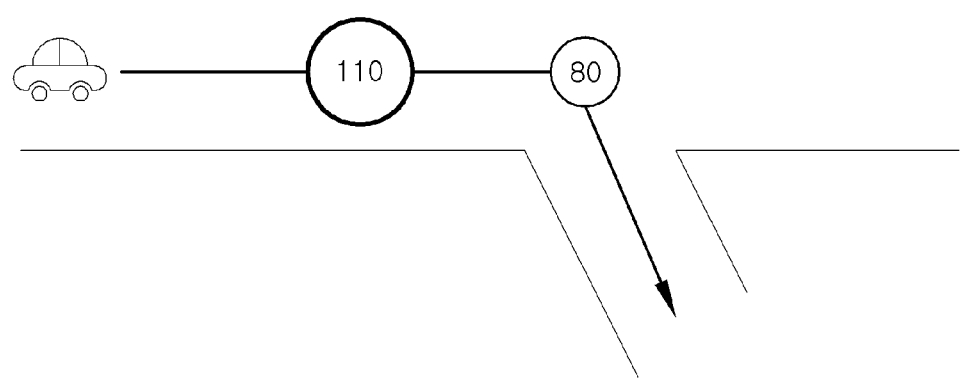

Next, FIG. 3B corresponds to the above-described situation of FIG. 2A, in which when a main road is a 110 km/h road on which a vehicle is driving and a driver is speeding, a situation is that a first front event is a speed camera and thus deceleration is required to a vehicle speed of 110 km/h, and a second front event is an IC entry requiring deceleration to a vehicle speed of 80 km/h. Further, a distance between the first front event and the second front event is in the range of 400 to 500 m.

The control method according to the present embodiment controls the events for the speed camera and the IC entry according to preset priorities.

As an example, the result is shown in FIG. 2B in a case in which the speed camera event has a priority higher than that of the IC entry event.

Unlike FIG. 2B described above, the control method provides inertia drive information according to 110 km/h at an 110 km/h start position having a higher priority instead of starting the provision of the inertia drive information at an 80 km/h start position, and thus when the inertia driving is performed according to the inertia drive information, the vehicle reaches a vehicle speed of 110 km/h at a 110 km/h target position, and the inertia driving is performed again until a 80 km/h target position after the vehicle passes the 110 km/h target position, such that the vehicle may be able to reach the 80 km/h target position.

Figure 6:
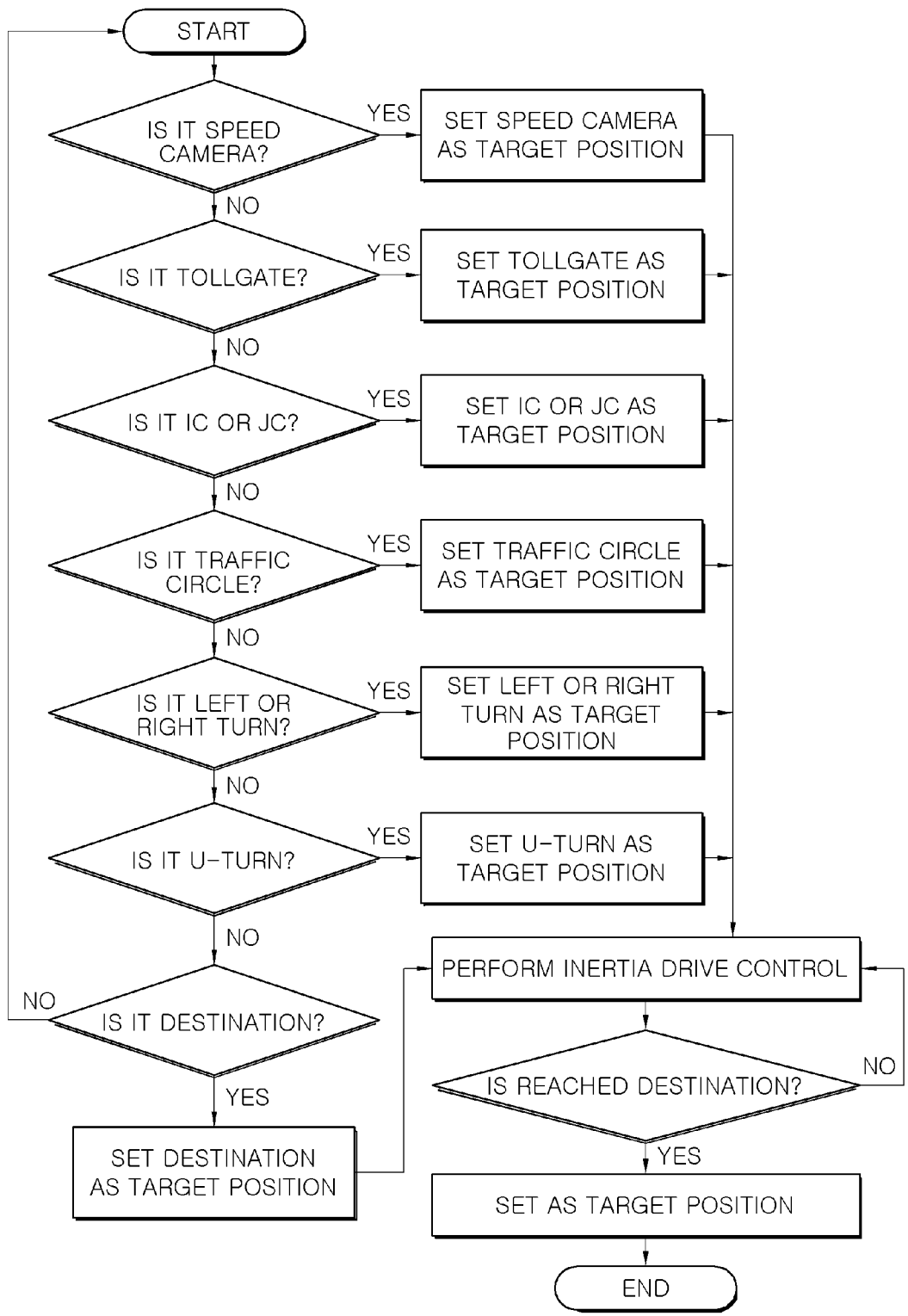
FIG. 6 is a flowchart illustrating the method of providing inertia drive information according to one embodiment of the present disclosure.

FIG. 6 is a flowchart illustrating the method of assigning a priority and illustrates an example in which a priority is set in the order of a speed camera, a tollgate, an IC or JC, a traffic circle, a left or right turn, a U-turn, and a destination.

2) Control Method according to Target Position Order

The control method according to the present embodiment is a method of performing control by prioritizing a closer target position among events.

This may be controlled according to a driver's intuition.

First, in the situation shown in FIG. 1A, the IC entry which is an event closer to a target position is prioritized and controlled.

Therefore, unlike FIG. 1B described above, the control method is performed according to the IC entry which is a first event reaching the target position first, such that the control method provides information according to 80 km/h at the 80 km/h start position, and thus when the inertia driving is performed according to the corresponding information, the vehicle reaches the vehicle speed of 80 km/h at the 80 km/h target position, and the inertia driving is performed again until the 30 km/h target position after the vehicle passes the 80 km/h target position, such that the vehicle may be able to reach the 30 km/h target position. Consequently, the obtained result is shown in FIG. 3A.

Next, in the situation shown in FIG. 2B, the speed camera event which is an event closer to a target position is prioritized and controlled.

Therefore, unlike FIG. 2B described above, the control method is performed according to the speed camera which is a first event reaching the target position first, such that the control method provides information according to 110 km/h at the 110 km/h start position, and thus when the inertia driving is performed according to the corresponding information, the vehicle reaches the vehicle speed of 110 km/h at the 110 km/h target position, and the inertia driving is performed again until the 80 km/h target position after the vehicle passes the 110 km/h target position, such that the vehicle may be able to reach the 80 km/h target position. Consequently, the obtained result is shown in FIG. 3B.

Figure 7:
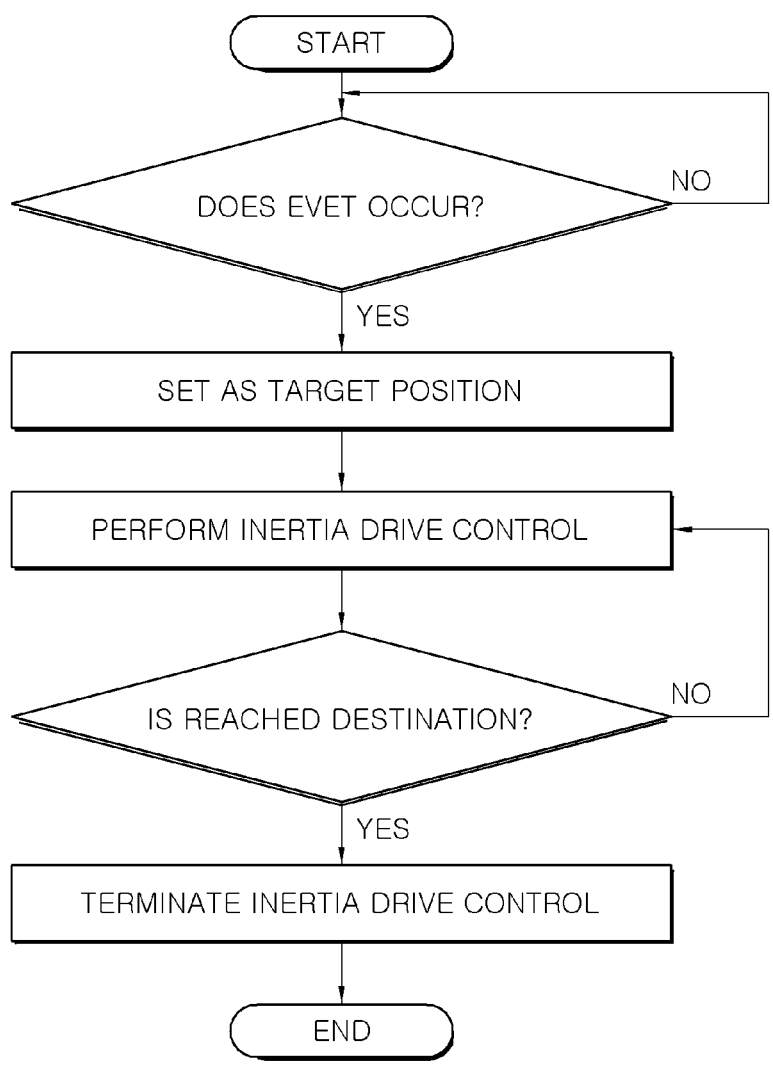
FIG. 7 is a flowchart illustrating the method of providing inertia drive information according to another embodiment of the present disclosure.

FIG. 7 is a flowchart illustrating the control method according to the target position order, and as shown in FIG. 7, whether an event is generated is determined and the inertia drive guidance is performed to allow the generated event to become the target position.

3) Integrated Control Method

Figure 8A:
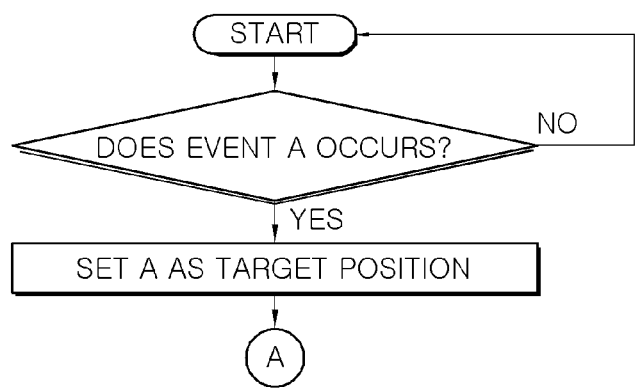
FIGS. 8A and 8B is a flowchart illustrating a method of providing inertia drive information according to still another embodiment of the present disclosure.
Figure 8B:
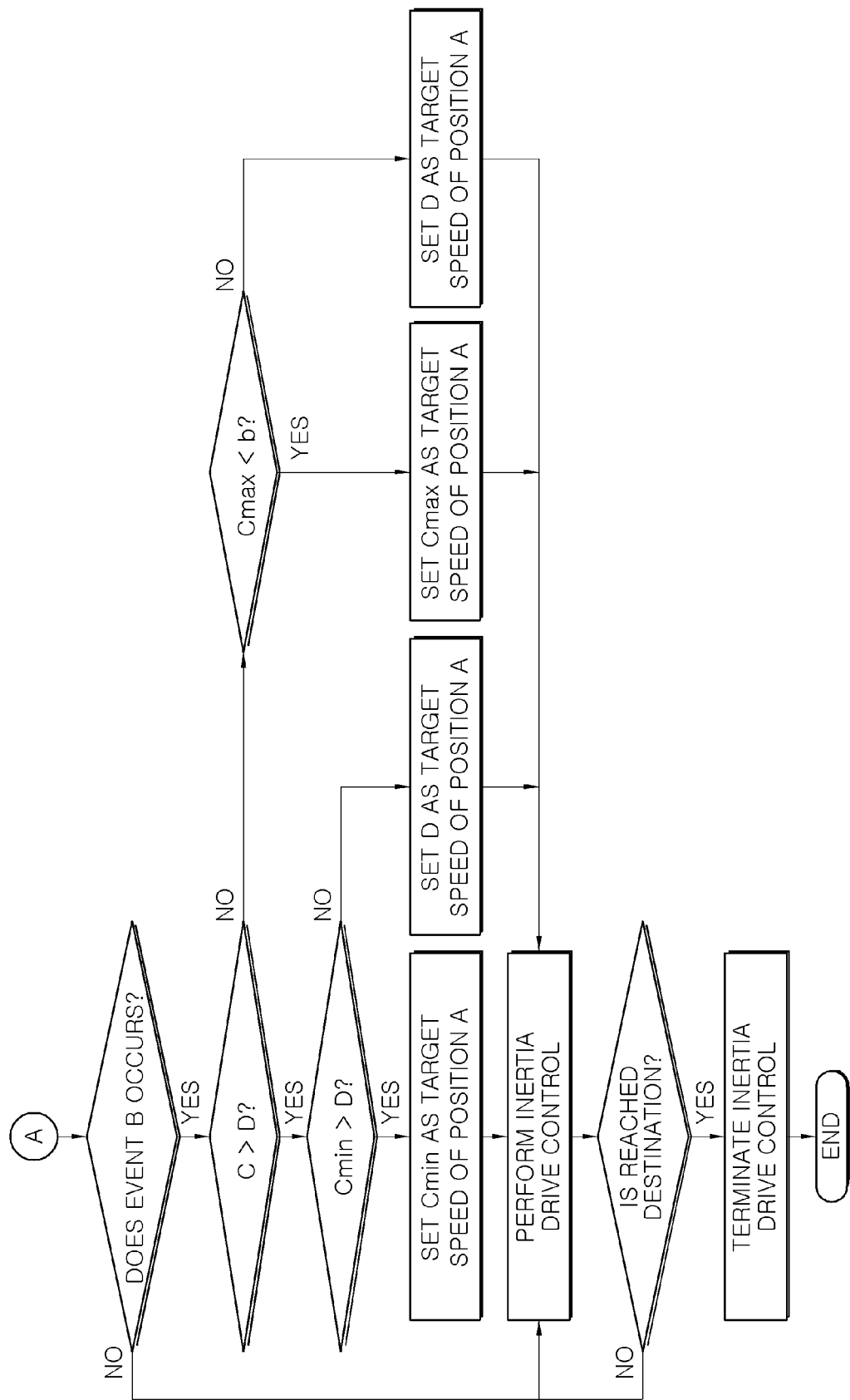

The control method according to the present embodiment is a method of performing control by setting a minimum value and a maximum value to each road and each event, and a flowchart of the control method is shown in FIGS. 8A and 8B.

That is, in a target speed, $-\beta$ is set to a minimum value, and $+\gamma$ is set to a maximum value.

However, in the case of the speed camera event, a vehicle speed should not exceed the target speed, so the maximum value is set equal to the target speed. For example, in the case of the speed camera event, the target speed is set in the range of 90 to 100 km/h.

The control method according to the above-described setting is as follows.

A close event is an event A, a far event is an event B, a target speed for the event A is C, and a speed is D at a point of time when reaching a target position of the event A according to control for B, and when C>D, the control method compares Cmin with D and then provides information in which a larger value of Cmin or D becomes a target speed for the event A. That is, when Cmin>D, Cmin is provided as the information upon control with the target speed for the event A and thus inertia driving is performed according to Cmin, and when Cmin≤D, D is provided as the information upon the control with the target speed for the event A and thus the inertia driving is performed according to D.

When C≤D, Cmax is compared with D, and information is provided such that a small value of Cmax or D becomes the target speed for the event A. That is, when Cmin≥D, information is provided such that D becomes the target speed for the event A upon control and thus the inertia driving is performed according to D, and when Cmax<D, information is provided such that Cmax becomes the target speed for the event A upon control and thus the inertia driving is performed according to Cmax.

Figure 4A:
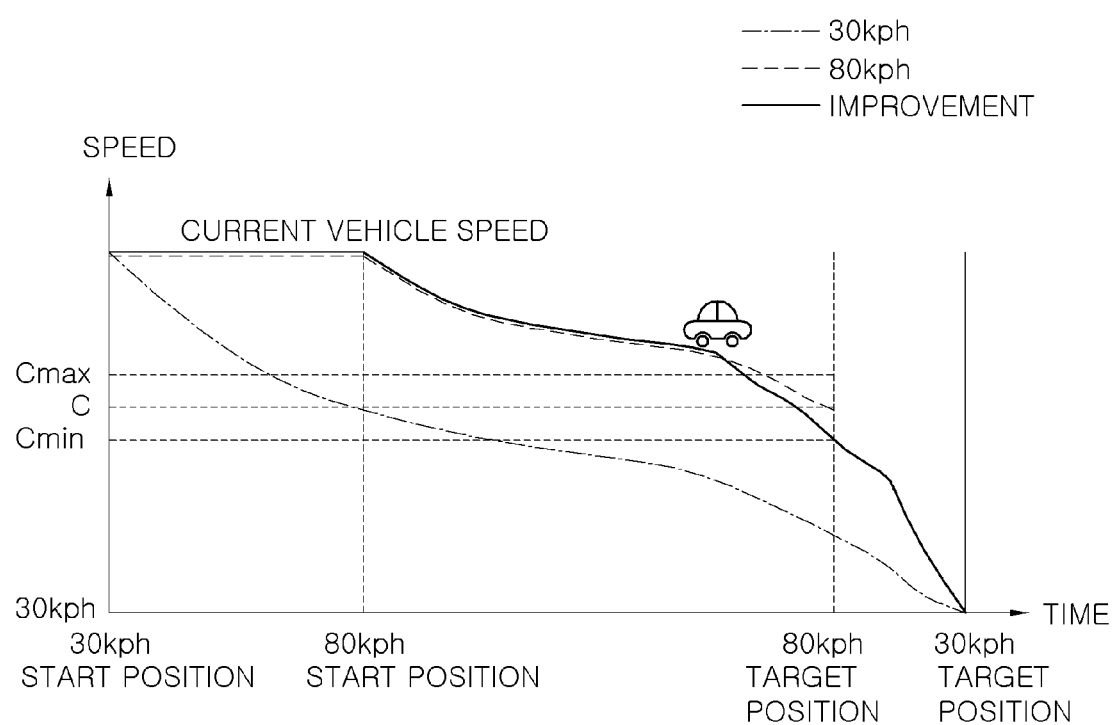
FIGS. 4A and 4B are graphs showing results of a method of providing inertia drive information according to another embodiment of the present disclosure.
Figure 4B:
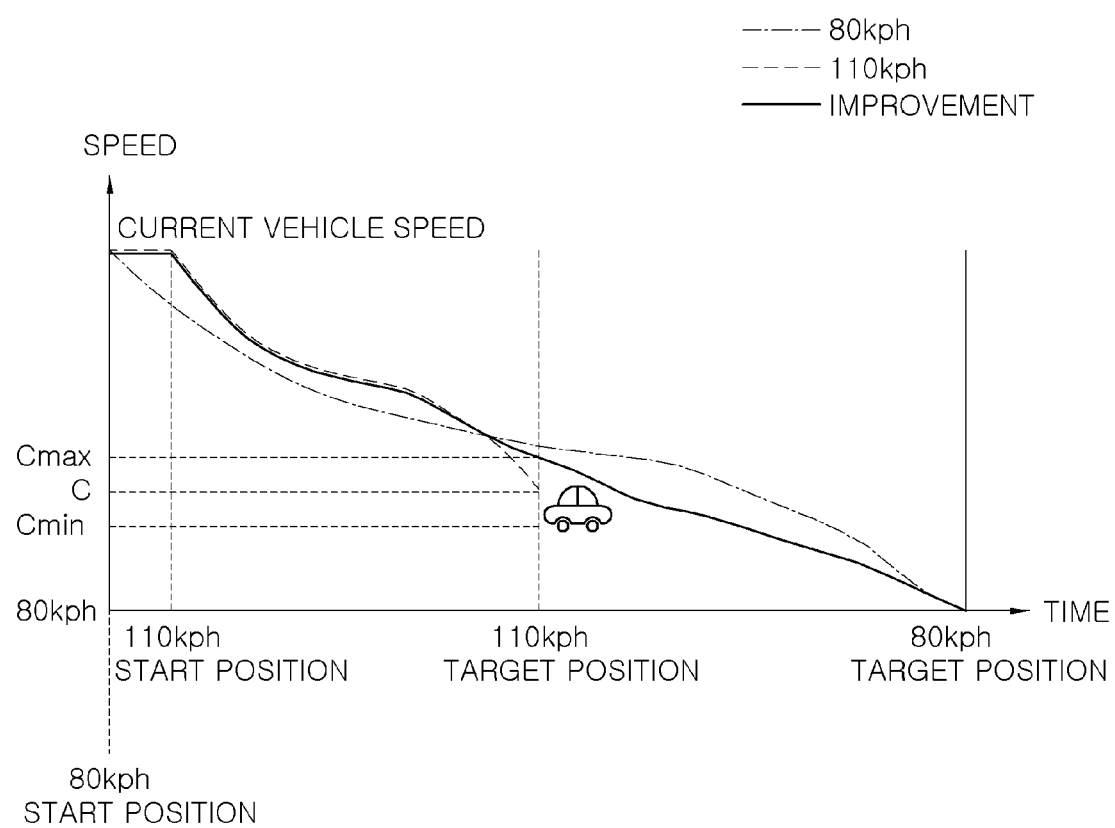

These results according to the above-described control method is shown in FIGS. 4A and 4B.

FIG. 4A corresponds to the situation of FIG. 1A described above, i.e., a situation when C>D, Cmin that is smaller than C by β is compared with D, and Cmin that is the large value is provided as information upon control with the target speed for the event A, such that the inertia driving may be performed.

Further, FIG. 4A is a situation when C≤D, Cmax that is greater than C by γ is compared with D, and Cmax that is the small value is provided as information upon the control with the target speed for the event A, such that the inertia driving may be performed.

In the situation of FIG. 1B described above, since the event A corresponds to the speed camera, Cmax becomes C instead of C+γ, such that the target speed for the event A is set as Cmax=C.

When control is performed with respect to the event B with the target speed C for the event A, in order to calculate D at the point of time when the vehicle reaches the target position of the event A, determination of a target vehicle speed, an estimated vehicle speed, a start position, and a conversion position is required.

Figure 9:
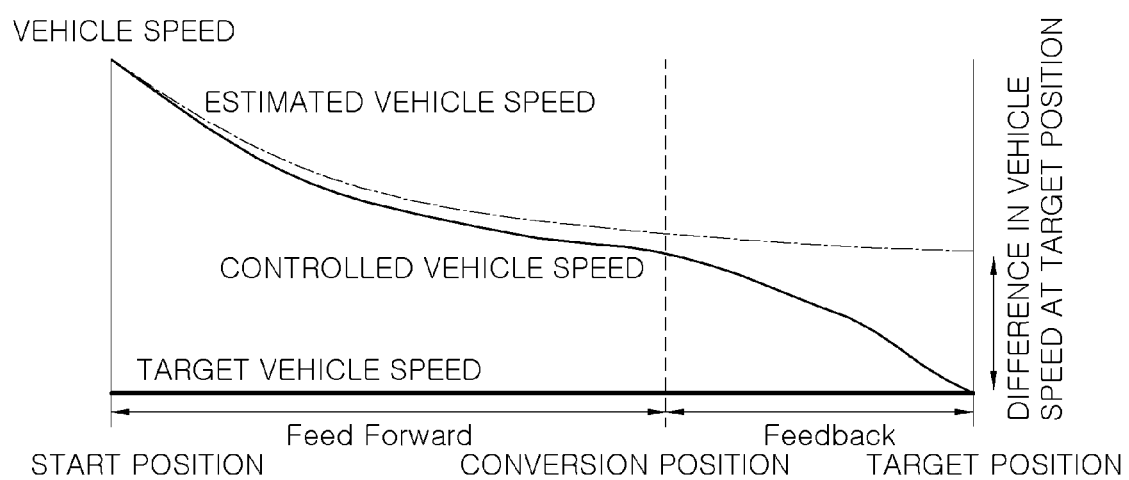
FIG. 9 is a graph showing a driving start position when a vehicle is driving at a target vehicle speed.

This will be further described with reference to FIG. 9.

The target vehicle speed needs to be classified for each event, and also a target vehicle speed variable factor according to a slope needs to be classified for each event. Therefore, it is possible to calculate an average slope to a front side and set a different target vehicle speed for each event according to the calculated average slope.

That is, the target vehicle speed is calculated as (flat ground target vehicle speed×slope factor), and a slope factor is calculated by a table in which an x-axis is set as (gradient between a current position and a target position) and a y-axis is set as the target vehicle speed.

Further, the determination of the estimated vehicle speed is to calculate an estimated vehicle speed that the vehicle is decelerated from a current vehicle speed to the target vehicle speed, and the estimated vehicle speed is calculated from a driving load a creep torque.

That is, the estimated vehicle speed is calculated by the current vehicle speed and [(C/D value of vehicle×factor)+(ascending or descending load×factor)+(creep torque×efficiency)].

Next, a start position is a position where the inertia drive guidance function is operated.

As provided herein, when deceleration is started at the current vehicle speed, a deceleration profile calculated from vehicle driving resistance up to the target vehicle speed is referred to as the estimated vehicle speed.

When a difference between the target vehicle speed and the estimated vehicle speed is referred to as a target position vehicle speed at a point of time when the vehicle is decelerated with the estimated vehicle speed to reach the target position, the start position is determined by a difference between the current vehicle speed and the target position vehicle speed.

Further, the conversion position becomes a position where feed forward control is converted into feedback control during creep torque control.

The conversion position may be differently mapped for each country, and in countries such Korea and the United States that prefer to smooth driving, the conversion position becomes closer to a start position, and in countries such as Europe that prefers to sporty driving, the conversion position becomes closer to a target position.

The conversion position is determined by the target vehicle speed and the event, the conversion position is determined as (target position−X for each target vehicle speed), and X is calculated by a table in which an x-axis is set as the target vehicle speed and a y-axis axis is set as the event.

An inertia drive guidance control method according to the applied embodiment of the present disclosure provides control information according to either low or high value of control speeds per event.

Figure 10:
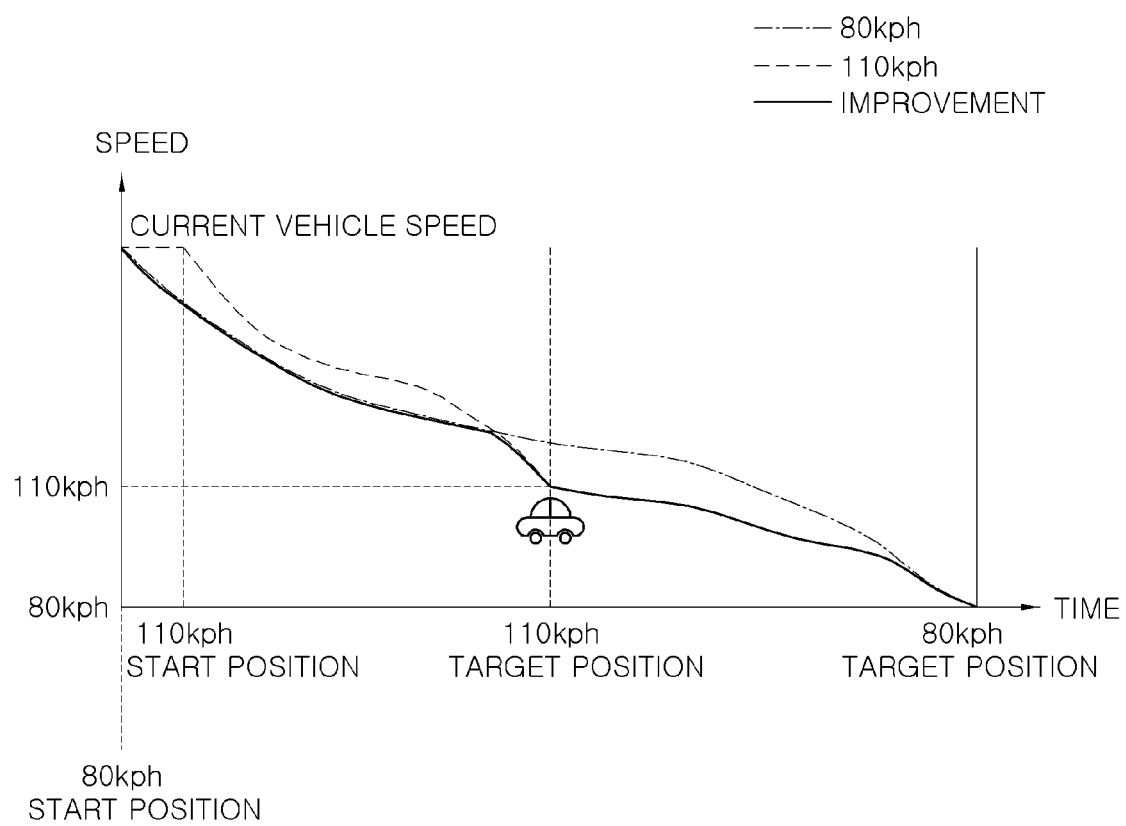
FIG. 10 is a graph showing a result of a method of providing inertia drive information according to an applied embodiment of the present disclosure.

FIG. 10 illustrates an example in which control speeds according to superimposed events are compared and controlled according to a low value, and as shown in FIG. 10, since a control speed of a corresponding event is low from a 80 km/h start position, the driver is provided with control information according to the control speed and since a control speed according to a vehicle speed of 110 km/h is low from a position not reaching a 110 km/h target position to the 110 km/h target position, the driver is provided with control information corresponds to the control speed according to the vehicle speed of 110 km/h, and the driver is provided with information for which the inertia driving is performed again according to an 80 km/h target speed after the 110 km/h target position to allow the vehicle to reach an 80 km/h target position.

Unlike the conventional control method, according to the above-described control methods of the three embodiments, it is possible to provide more reliable inertia drive information.

Figure 5A:
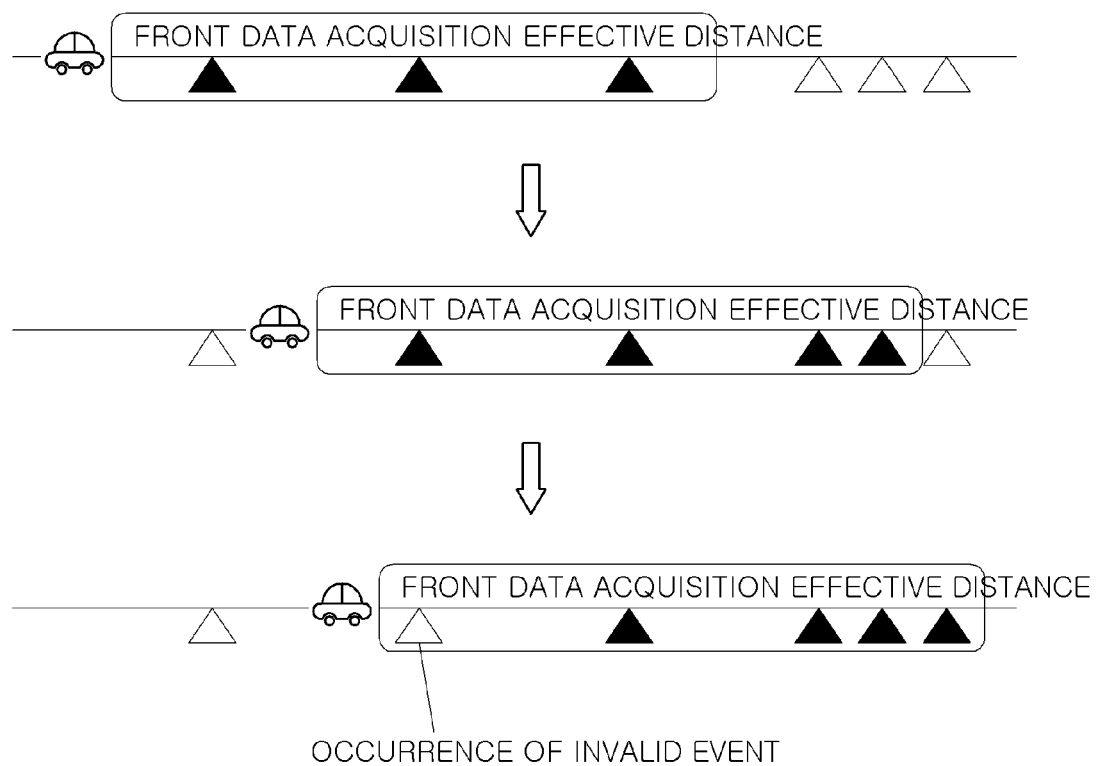
FIGS. 5A and 5B are diagrams illustrating improvement at a point of time for updating a front event.
Figure 5B:
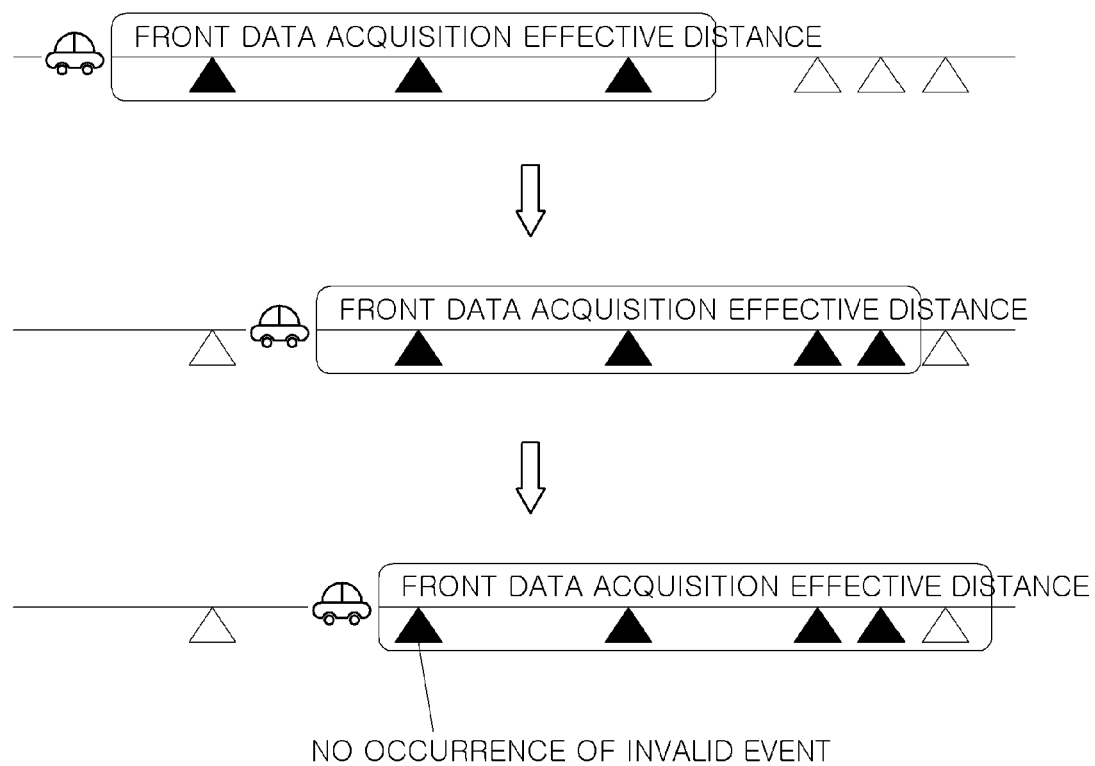

Next, a method of selecting a piece of valid data when front superimposed information is excessive will be described with reference to FIGS. 5A and 5B. In FIGS. 5A and 5B, a black color denotes a valid event, and a white color denotes an invalid event.

Conventionally, since a front data acquisition effective distance is set, a predetermined number of pieces of data within a corresponding section is processed as pieces of valid data.

Therefore, when many events are gathered within the front data acquisition effective distance as shown in FIG. 5A, updating is performed even though there are events which are not yet reached, such that there occurs a case in which a closest event becomes an invalid event.

In contrast, in the embodiment of the present disclosure, a piece of valid data is selected according to the number of pieces of information, and the updating is not performed before the vehicle passes a target position of a corresponding event, such that the closest event is prevented from becoming an invalid event due to the updating. Accordingly, a new event included in an effective distance may not be changed to a piece of valid data before the updating.

Figure 11:
FIG. 11 is a diagram illustrating an applied embodiment for improvement at a point of time for updating a front event.

FIG. 11 illustrates an applied example of a valid data selection, and as shown in FIG. 10, the applied embodiment corresponds to a method of fundamentally blocking a closest event from becoming an invalid event by performing control according to only a highest priority.

In accordance with a method for providing inertia drive information, even when front events are superimposed, information on an inertia drive start position can be accurately provided, such that the driver can rely without anxiety.

Consequently, the driver can improve fuel efficiency by properly referring to inertia driving.

Further, it is possible to improve a problem in that an event is updated during control and a target position is changed, such that the control is terminated.

While the present disclosure has been described with respect to the specific embodiments, it will be apparent to those skilled in the art that various changes and modifications may be made without departing from the spirit and scope of the disclosure as defined in the following claims. Accordingly, it should be noted that such alternations or modifications fall within the claims of the present disclosure, and the scope of the present disclosure should be construed on the basis of the appended claims.

What is claimed is:

1. A method of providing inertia drive information to perform inertia driving of a vehicle, comprising the steps of:
   recognizing a target position, where deceleration is required from a current speed of the vehicle, as an inertia drive event on a driving route at which a destination is set by a navigation function;
   when a plurality of inertia drive events are recognized in the step of recognizing the target position as the inertia drive event, comparing a target speed C of an inertia drive event that is first upcoming with a target speed D of an inertia drive event that is upcoming later among the plurality of inertia drive events;
   when the target speed C of the inertia drive event that is first upcoming is greater than the target speed D of the inertia drive event that is upcoming later, comparing the target speed D with a preset minimum value Cmin of the target speed C of the inertia drive event that is first upcoming;
   determining an inertia drive start position required to reach, with a greater value of the preset minimum value Cmin or the target speed D, a target position of the inertia drive event that is first upcoming; and
   providing information on an inertia drive start position by the navigation function.

2. The method of claim 1, further comprising the steps of:
   when the target speed C is less than the target speed D, comparing the target speed D with the preset maximum value Cmax of the target speed C of the inertia drive event that is first upcoming; and
   determining the inertia drive start position required to reach, with a s value of the preset maximum value Cmax or the target speed D, the target position of the inertia drive event that is first upcoming.

3. The method of claim 2, wherein, when the inertia drive event that is first upcoming is an event relating to a speed camera posted on a side of a street to capture a speed vehicle, the preset maximum value Cmax is set to a value equal to the target speed C.

4. The method of claim 2, further comprising the steps of:
   determining whether the vehicle passes the inertia drive event, which is first upcoming, among the plurality of inertia drive events; and
   when the vehicle is determined as passing the inertia drive event that is first upcoming, updating the inertia drive event at a current location of the vehicle.

5. The method of claim 4, wherein
   the step of recognizing the target position as the inertia drive event is performed with respect to target positions within a front data acquisition effective distance of the vehicle; and
   when the vehicle is determined as not passing the inertia drive event that is first upcoming even though a new target position occurs within the front data acquisition effective distance, the step of recognizing the target position as the inertia drive event does not recognize the new target position as the inertia drive event.

* * * * *